(12) United States Patent
Axmon et al.

(10) Patent No.: US 11,177,893 B2
(45) Date of Patent: Nov. 16, 2021

(54) ITS STATUS INDICATION

(71) Applicant: Telefonaktiebolaget LM Ericsson (publ), Stockholm (SE)

(72) Inventors: Joakim Axmon, Limhamn (SE); Muhammad Kazmi, Sundbyberg (SE); Santhan Thangarasa, Vällingby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 16/471,700

(22) PCT Filed: Dec. 21, 2016

(86) PCT No.: PCT/EP2016/082143
§ 371 (c)(1),
(2) Date: Jun. 20, 2019

(87) PCT Pub. No.: WO2018/113946
PCT Pub. Date: Jun. 28, 2018

(65) Prior Publication Data
US 2019/0319723 A1    Oct. 17, 2019

(51) Int. Cl.
*H04B 17/309* (2015.01)
*H04W 24/08* (2009.01)

(52) U.S. Cl.
CPC .......... *H04B 17/309* (2015.01); *H04W 24/08* (2013.01)

(58) Field of Classification Search
CPC .. H04B 17/309; H04B 17/318; H04B 17/336; H04B 7/26; H04B 7/2606; H04W 40/12; H04W 40/22; H04W 84/04; H04W 88/02; H04W 24/08; H04W 76/14; H04W 76/23; H04W 36/0083; H04W 36/30; H04W 92/18; H04W 88/04; H04W 8/005; H04L 69/324
See application file for complete search history.

(56) References Cited

U.S. PATENT DOCUMENTS

| 10,470,097 B2 * | 11/2019 | Lee ..................... H04W 36/03 |
| 2006/0015242 A1 | 1/2006 | Yoshida |
| 2013/0253750 A1 | 9/2013 | Otake |
| 2014/0119210 A1 | 5/2014 | Bansal et al. |

(Continued)

FOREIGN PATENT DOCUMENTS

| GB | 2471347 A | 12/2010 |
| WO | 2016022844 A1 | 2/2016 |

(Continued)

OTHER PUBLICATIONS

Huawei (3GPP TSG RAN WG1 Meeting #86bis, R1-1608592, Lisbon, Portugal, Oct. 10-14, 2016) (Year: 2016).*

(Continued)

*Primary Examiner* — Hardikkumar D Patel
(74) *Attorney, Agent, or Firm* — Sage Patent Group

(57) ABSTRACT

A method, wireless device, and network node for providing notification of a status of an intelligent traffic system (ITS) sidelink in a communication network. In one embodiment, the method includes obtaining channel quality measurement data of the ITS sidelink, assigning a sidelink status based on the obtained channel quality measurement data (S120), and providing a feedback indicator based on the sidelink status (S130).

24 Claims, 5 Drawing Sheets

(56) References Cited

U.S. PATENT DOCUMENTS

| | | | |
|---|---|---|---|
| 2015/0156662 A1 | 6/2015 | Bai et al. | |
| 2016/0330728 A1 | 11/2016 | Sorrentino et al. | |
| 2016/0338095 A1 | 11/2016 | Faurie et al. | |
| 2017/0019886 A1* | 1/2017 | Patel | H04W 4/70 |
| 2017/0289934 A1* | 10/2017 | Sheng | G01S 19/14 |
| 2018/0123682 A1* | 5/2018 | Jung | H04B 7/2606 |
| 2018/0139724 A1* | 5/2018 | Loehr | H04W 72/02 |
| 2018/0160325 A1* | 6/2018 | Cheng | H04W 76/14 |

FOREIGN PATENT DOCUMENTS

| | | | |
|---|---|---|---|
| WO | 2016163823 A1 | 10/2016 | |
| WO | 2016189392 A1 | 12/2016 | |

OTHER PUBLICATIONS

Unknown, Author, "Configuration of PC5 and/or Uu for V2V transport", Huawei et al., 3GPP TSG-RAN WG2 Meeting #93bis, R2-162289, Dubrovnik, Croatia, Apr. 11-15, 2016, pp. 1-5.

Unknown, Author, "Congestion Control for V2V", Huawei et al., 3GPP TSG RAN WG1 Meeting #86bis, R1-1608592, Lisbon, Portugal, Oct. 10-14, 2016, pp. 1-4.

Unknown, Author, "Discussion on measurement requirements for V2X", Ericsson, 3GPP TSG-RAN WG4 Meeting #81, R4-1610207, Reno, US, Nov. 14-18, 2016, pp. 1-2.

Unknown, Author, "Discussion on the V2V path selection between Uu and PC5", ZTE, 3GPP TSG-RAN WG2 Meeting #93bis, R2-162401, Dubrovnik, Croatia, Apr. 11-15, 2016, pp. 1-3.

Unknown, Author, "Radio Measurements for congestion control for V2X", Ericsson, 3GPP TSG RAN WG1 Meeting #86, R1-166953, Gothenburg, Sweden, Aug. 22-26, 2016, pp. 1-4.

Unknown, Author, "Summary of [93bis#24] [LTE2V] Tx PC5 and Uu path switch for V2V", Huawei, HiSilicon, 3GPP TSG RAN WG2 Meeting #94, R2-163815, Nanjing, China, May 23-27, 2016, pp. 1-23.

Unknown, Author, "Vehicle-to-Vehicle Communications: Readiness of V2V Technology for Application", U.S. Department of Transportation; Vehicle-to-Vehicle Communication Technology, 2014, pp. 1-4.

European Office Action issued in corresponding EP Application No. 16826034.7 dated Jun. 12, 2020, 08 Pages.

First Chinese Office Action for Chinese Patent Application No. CN 201680092104.7 dated May 26, 2021, 20 pages (including English translation).

LG Electronics, 3GPP TSG RAN Meeting #72, RP-160792, "Support for V2V Services Based on LTE Sidelink", Busan, Korea, Jun. 13-16, 2016, 23 pages.

* cited by examiner

ITS STATUS INDICATION

TECHNICAL FIELD

Wireless communication and in particular, a method, wireless device, and network node for using a wireless communication network to provide notification of the status of an intelligent traffic system (ITS) sidelink to the occupants of a vehicle.

INTRODUCTION

Device-to-Device Operation and D2D Communication in LTE

Release 12 of the Long Term Evolution (LTE) standard has been extended with support of Device-to-Device (D2D) (also referred to as "sidelink" communications) features targeting both commercial and Public Safety applications. Some applications enabled by Rel-12 LTE are device discovery, where devices are able to sense the proximity of another device and associated application by broadcasting and detecting discovery messages that carry device and application identities. Another application consists of direct communication based on physical channels terminated directly between devices.

D2D communications enable devices in the proximity of each other to communicate in a peer-to-peer (direct) fashion rather than communicating through some wireless access point or base station. In practice, D2D wireless devices in the $3^{rd}$ Generation Partnership Project (3GPP) LTE system utilize the cellular uplink spectrum, i.e., they transmit D2D signals or channels in the uplink part of the spectrum.

According to the currently standardized and state of the art solutions, D2D operation by a wireless device is in a half-duplex mode, i.e., the wireless device can either transmit D2D signals/channels or receive D2D signals/channels. There may also be D2D relay wireless devices that may relay some signals to other D2D wireless devices. There is also control information for D2D communication, some of which is transmitted by D2D wireless devices and the other can be transmitted by network nodes such as a base station such as an evolved Node B (eNB) (e.g., D2D resource grants for D2D communication transmitted via cellular downlink control channels). The D2D transmissions may occur on resources which are configured by the network or selected autonomously by the D2D wireless device.

In LTE, D2D communication supports two different modes of D2D operation: mode 1 and mode 2. In mode 1, the location of the resources for transmission of the scheduling assignment by the broadcasting wireless device, i.e., a User Equipment (UE) comes from the eNodeB. The location of the resource(s) for transmission of the D2D data by the broadcasting wireless device comes from the eNodeB. In mode 2, a resource pool for scheduling assignment is pre-configured and/or semi-statically allocated. The wireless device on its own selects the resource for scheduling assignment from the resource pool for scheduling assignment to transmit its scheduling assignment.

As used herein, D2D operation is a generic term which may include transmission and/or reception of any type of D2D signals (e.g., physical signals, physical channel, etc.) by a D2D communication capable wireless device and/or by a D2D discovery capable wireless device. D2D operation is therefore also called as D2D transmission, D2D reception, D2D communication, etc.

A D2D wireless device is also interchangeably called a proximity services (ProSe) capable wireless device. Similarly, D2D operation is also interchangeably called ProSe operation. A D2D discovery capable wireless device is also referred to as a wireless device capable of ProSe direct discovery and a D2D direct communication wireless device is also referred to as a wireless device capable ProSe direct communication. D2D operation may also interchangeably be called ProSe operation. The link/carrier that is used for the ProSe direct communication and ProSe direct discovery between wireless devices is referred to as a sidelink. The ProSe operation performed by the wireless device may broadly include ProSe reception (i.e., receiving ProSe signals) and/or ProSe transmission (i.e., transmitting ProSe signals). The scenarios in which D2D operation (i.e., ProSe) is supported are:

In Network Coverage (INC): In the INC scenario, D2D wireless devices are under the full coverage of one or more network nodes. The D2D wireless devices are able to receive signals from and/or transmit signals to at least one network node. The D2D wireless device can also maintain a communication link with the network node. INC is also known as "in coverage."

Partial Network Coverage (PNC): In the PNC scenario, at least one of the D2D wireless devices among D2D wireless devices involved in D2D communication is under the network coverage, and at least one D2D wireless device is not under network coverage. PNC is also known as "partial coverage."

Out-Of-Network Coverage (ONC): In the ONC scenario, none of D2D wireless devices involved in D2D communication are under network coverage. None of the D2D wireless devices can receive signals from and/or transmit signals to any of the network nodes. ONC is also called as "out-of-coverage" or "any cell selection state."

V2x Communication in LTE

One of the potential extensions of D2D systems includes support of V2x communication, which includes any combination of direct communication between vehicles, pedestrians and infrastructures. Therefore, "x" may denote "vehicular" (i.e., Vehicle-to-Vehicle, or "V2V"), or x may denote "pedestrian" (i.e., Vehicle-to-Pedestrian, or "V2P"), or x may denote "infrastructure"' (i.e., Vehicle-to-Infrastructure or "V2I"), or may denote any other type of entity. The embodiments described herein are applicable for any type of D2D operation including ProSe, V2x, etc.

V2x communication may take advantage of a network (NW) infrastructure, when available, but at least basic V2x connectivity should be possible even in case of a lack of coverage. Providing an LTE-based V2x interface may be economically advantageous because of the LTE economies of scale and it may enable tighter integration between communications with the NW infrastructure, i.e., V2I, V2P and V2V communications, as compared to using a dedicated V2x technology.

V2x communications may carry both non-safety and safety information, where each of the applications and services may be associated with specific requirements sets, e.g., in terms of latency, reliability, capacity, etc. The European Telecommunications Standard Institute (ETSI) has defined two types of messages for road safety: Co-operative Awareness Message (CAM) and Decentralized Environmental Notification Message (DENM).

V2V operation may support higher speeds compared to legacy cellular devices. An absolute speed of 250 km/h and a relative speed of 500 km/h are expected to be supported. Unlike legacy devices, V2V devices are fast moving, and the operating scenario can be quite dense. As V2V is based on ProSe/D2D technology, V2V is expected to operate in both in-coverage and out-of-network coverage. It can operate on a dedicated spectrum or it can operate with a shared spectrum. In the first case, a spectrum which is strictly assigned to V2V operation is used while in the second case the spectrum may be shared between several other technologies. In an example, the LTE uplink spectrum could be shared between LTE uplink and V2V. In a second example, the spectrum could be shared between unlicensed technology (e.g., IEEE 802.11 WAVE, 802.11p) and V2V.

Another standard is being developed by the 3GPP standards organization specifies V2V communication between vehicles over a sidelink in the 5.9 GHz band. Introduction of further features, including simultaneous connection to Wide Area Network (WAN) and over a sidelink are being discussed.

The information provided over the sidelink in V2V communication may include, for example:
 Forward collision warning
 Blind spot warning
 Lane change warning
 Do-not-pass warning Forward collision warning may indicate to the driver that a car in front of him/her is decelerating abruptly, and this indication gives the driver more time to react to avoid hitting the rear of the car in front. Blind spot warning, lane change warning and do-not-pass warnings may indicate to the driver that it is unsafe to, for example, overtake a car. These messages are also known as CAM and/or DENM messages. These are described in greater detail below.

European regulations mandate wireless devices operating in the 5.9 GHz Intelligent Traffic System (ITS) band to implement congestion control. One proposal on how such congestion control can be implemented is provided in the 3GPP Radio Access Network (RAN) Working Group Document R1-166953, where the so called channel busy ratio (CBR) measurements are used for determining whether the wireless device is allowed to transmit over the sidelink.

As a cooperative approach, vehicular communication systems can be more effective in avoiding accidents and traffic congestion than if each vehicle tries to solve these problems individually. The U.S. National Highway Traffic Safety Administration (NHSTA) predicts that when the whole fleet is equipped with V2V communication and/or Vehicle-to-Internet communication, collectively referred to as vehicle-to-anything (V2x), up to 80% of accidents not involving driving under the influence can be prevented or becoming less severe.

Cooperative Awareness Message

Cooperative Awareness Messages (CAMs) are intended to enable vehicles, including emergency vehicles, to notify their presence and other relevant parameters in a broadcast fashion. Such messages target other vehicles, pedestrians, and infrastructures, and are handled by their applications. CAM messages also serve as active assistance to safety driving for normal traffic. The content of CAM will depend on the device type. Typical contents may include, but are not limited to, the following:
 information on time,
 position,
 motion state,
 activated systems,
 vehicle type,
 and the role of the vehicle in the road traffic, etc.

The purpose of exchanging CAMs is to inform other vehicles of the presence, type, and status of the vehicle. The received information can be used by the wireless device in several ways. For example, the wireless device could compare the status of the received vehicle with its own, it can use this information to estimate the collision risk with the received wireless device, or it can use the received information directly or indirectly in other applications or services in the vehicle. By comparing or correlating the received information to its own information or to some predefined thresholds or rules, the criticality of the information can be determined.

The triggering conditions for CAM generation can depend on various reasons. In one example, the triggering can be based on whether the time elapsed since the time of the last CAM generation is equal to or greater than a decentralized congestion control (DCC) interval, and can also be related to changes in wireless device dynamics. Some non-limiting examples of wireless device dynamics are whether the distance between the current position of the wireless device and the position included in the previous CAM message exceeds 4 m, whether the difference between the current direction the wireless device is heading in and the direction the wireless device was heading in a previous CAM exceeds 4 degrees, and whether the difference between the current speed of the wireless device and the speed of the wireless device in a previous CAM exceeds 0.5 m/s.

A second triggering condition requires that the time elapsed since the last CAM generation is equal to or greater than a certain a certain threshold (e.g., T_GenCAM), and equal or greater than the DCC related interval. The triggering conditions are checked periodically, for example, at least every 100 ms, but it can be checked more frequently than this.

The availability of a CAM message is indicatively checked every 100 ms, yielding a maximum detection latency requirement of <=100 ms for most messages. However, the latency requirement for Pre-crash sensing warning is 50 ms. In some cases, the CAM generation interval is specified using a threshold (e.g., T_GenCam_DCC). The value range of T_GenCam_DCC can be, for example, limited to 100 ms≤T_GenCam_DCC≤1000 ms.

Decentralized Environmental Notification Messages

Decentralized Environmental Notification Messages (DENMs) are event-triggered messages that are disseminated to other V2V wireless devices in its proximity (also known as relevance area). The size and the shape of the relevance area may depend on the event type and the event location. For example, if the event location is very close to the receiving wireless device location, then the relevance area may be large. The DENM messages may include at least the following:
 information related to event type,
 information related to position of the event,
 information related to event detection time, etc.

The receiving wireless device may use the positioning information in received DENM message to compare to its own position which may already be known, and from this comparison it can find out the criticality or the relevance of the received/reported event. For example, it may combine the received positioning information with the relevance area information with its own wireless device information to better determine the criticality of the event. Some non-limiting examples of events that may trigger the DENM messages are: accidents, roadworks, adverse weather condition, vehicle breakdown, collision risk, etc. The DENM transmissions can be repeated over time as long the event is present.

Congestion in the 5.9 GHz ITS band may prevent wireless devices from sending critical information such as a Forward Collision Warning. As a result, drivers do not get warned and the risk for rear collisions increases due to shortened reaction time. Instead of being given an early warning, the driver will have to find out for themselves that cars in front of him/her are decelerating abruptly.

SUMMARY

In one aspect of the present disclosure, a method for using a wireless device to provide notification of a status of an intelligent traffic system (ITS) sidelink in a communication network is provided. The method includes obtaining channel quality measurement data of the ITS sidelink, assigning a sidelink status based on the obtained channel quality measurement data, and providing a feedback indicator based on the sidelink status.

According to an embodiment of this aspect, the feedback indicator indicates two or more levels of the status of the ITS sidelink, the levels including, reliable and unreliable. In another embodiment, the feedback indicator indicates that the status of the ITS sidelink is one of an ITS sidelink operation is allowable, an ITS sidelink operation is not allowable, an ITS sidelink operation is allowable with limited reliability, the ITS sidelink is currently available, the ITS sidelink is of a medium quality, and the ITS sidelink is of a high quality.

In another embodiment, the feedback indicator indicates a change in the status of the ITS sidelink. In another embodiment, detecting the change in the status of the ITS sidelink includes comparing a previous status to a currently determined status. In another embodiment, if it is determined that the change in the ITS sidelink status is from a less reliable level to a more reliable level, the method further includes delaying the providing of the feedback indicator by a predetermined amount of time, and if it is determined that the change in the ITS sidelink status is from a more reliable level to a less reliable level, the method further includes providing the feedback indicator without a delay.

In another embodiment, the channel quality measurement data includes at least one of a Channel Occupancy Rate (COR) measurement, a Channel Busy Ratio (CBR) measurement, a Radio Link Monitoring (RLM) measurement, a Sidelink-Reference Signal Received Power (S-RSRP) measurement, a Sidelink-Reference Signal Received Quality (S-RSRQ) measurement, a Sidelink-Reference Signal-Signal to Noise Ratio (S-RS-SINR) measurement, a Sidelink-Received Signal Strength Indicator (S-RSSI), and a bit error ratio (BER).

In another embodiment, assigning the sidelink status based on the obtained channel quality measurement data includes comparing the obtained channel quality measurement data to at least one threshold, each of the at least one threshold indicative of a certain sidelink status level. In another embodiment, the method further includes identifying a composite channel quality measurement based on the obtained channel quality measurement data, the composite channel quality measurement obtained by at least one of majority decision, consensus decision, logical combination of relations between individual measurements, arithmetic combination of individual measurements, comparison between measurements, and comparison between measurements and at least one threshold.

In another embodiment, the feedback indicator includes at least one of a visual indicator, an audial indicator, and a haptic indicator. In another embodiment, the feedback indicator includes at least one of the obtained channel quality measurement data of the ITS sidelink and the sidelink status.

In another embodiment, the channel quality measurement data of the ITS sidelink is obtained from a network node. In another embodiment, the method further includes providing the feedback indicator to at least one of at least one network node and at least one other wireless device. In another embodiment, the channel quality measurement data of the ITS sidelink is obtained with a varying occurrence depending on a mobility state of the wireless device. In another embodiment, the mobility state of the wireless device includes at least one of a speed of the wireless device, a direction of movement of the wireless device, a change in the speed of the wireless device, a change in the direction of the movement of the wireless device, and at least one of a trajectory and path of movement of the wireless device.

According to another aspect of the disclosure, a wireless device configured to provide notification of a status of an ITS sidelink in a communication network is provided. The wireless device includes a communications interface configured to obtain channel quality measurement data of the ITS sidelink, and processing circuitry including a memory and a processor, the memory in communication with the processor, the memory having instructions that, when executed by the processor, configure the processor to assign a sidelink status based on the obtained channel quality measurement data and cause the provision of a feedback indicator based on the sidelink status.

According to an embodiment of this aspect, the feedback indicator indicates two or more levels of the status of the ITS sidelink, the levels including, reliable and unreliable. In another embodiment, the feedback indicator indicates that the status of the ITS sidelink is one of an ITS sidelink operation is allowable, an ITS sidelink operation is not allowable, an ITS sidelink operation is allowable with limited reliability, the ITS sidelink is currently available, the ITS sidelink is of a medium quality, and the ITS sidelink is of a high quality.

In another embodiment, the sidelink status indicator indicates a change in the status of the ITS sidelink. In another embodiment, detecting the change in the status of the ITS sidelink includes comparing a previous status to a currently determined status. In another embodiment, if it is determined that the change in the ITS sidelink status is from a less reliable level to a more reliable level, the processor is further configured to delay the providing of the feedback indicator by a predetermined amount of time, and if it is determined that the change in the ITS sidelink status is from a more reliable level to a less reliable level, the processor is further configured to provide the feedback indicator without a delay.

In another embodiment, the channel quality measurement data includes at least one of a Channel Occupancy Rate (COR) measurement, a Channel Busy Ratio (CBR) measurement, a Radio Link Monitoring (RLM) measurement, a Sidelink-Reference Signal Received Power (S-RSRP) measurement, a Sidelink-Reference Signal Received Quality (S-RSRQ) measurement, a Sidelink-Reference Signal-Signal to Noise Ratio (S-RS-SINR) measurement, a Sidelink-Received Signal Strength Indicator (S-RSSI), and a bit error ratio (BER).

In another embodiment, assigning the sidelink status based on the obtained channel quality measurement data includes comparing the obtained channel quality measurement data to at least one threshold, each of the at least one threshold indicative of a certain sidelink status level. In another embodiment, the processor is further configured to identify a composite channel quality measurement based on the obtained channel quality measurements, the composite channel quality measurement obtained by at least one of majority decision, consensus decision, logical combination of relations between individual measurements, arithmetic combination of individual measurements, comparison between measurements, and comparison between measurements and at least one threshold.

In another embodiment, the feedback indicator includes at least one of a visual indicator, an audial indicator, and a haptic indicator. In another embodiment, the feedback indicator includes at least one of the obtained channel quality measurement data of the ITS sidelink and the sidelink status. In another embodiment, the channel quality measurements of the ITS sidelink are obtained from a network node. In another embodiment, the communications interface is further configured to provide the feedback indicator to at least one of a network node and at least one other wireless device. In another embodiment, the channel quality measurement data of the ITS sidelink is obtained with a varying occurrence depending on a mobility state of the wireless device. In another embodiment, the mobility state of the wireless device includes at least one of a speed of the wireless device, a direction of movement of the wireless device, a change in the speed of the wireless device, a change in the direction of the movement of the wireless device, and at least one of a trajectory and path of movement of the wireless device.

According to another aspect of the disclosure, a method, in a network node, for determining a status of an ITS sidelink in a communication network is provided. The method includes obtaining channel quality measurement data of the ITS sidelink, assigning a sidelink status based on the obtained channel quality measurement data, and notifying a wireless device in the communication network of the assigned sidelink status.

In an embodiment of this aspect, the method further includes transmitting at least one of the obtained channel quality measurement data and the assigned sidelink status to at least one of another network node and at least one other wireless device. In another embodiment, the assigned sidelink status indicates two or more levels of the status of the ITS sidelink, the levels including, reliable and unreliable. In another embodiment, the assigned sidelink status indicates that the status of the ITS sidelink is one of an ITS sidelink operation is allowable, an ITS sidelink operation is not allowable, an ITS sidelink operation is allowable with limited reliability, the ITS sidelink is currently available, the ITS sidelink is of a medium quality, and the ITS sidelink is of a high quality. In another embodiment, In another embodiment, the channel quality measurement data includes at least one of a Channel Occupancy Rate (COR) measurement, a Channel Busy Ratio (CBR) measurement, a Radio Link Monitoring (RLM) measurement, a Sidelink-Reference Signal Received Power (S-RSRP) measurement, a Sidelink-Reference Signal Received Quality (S-RSRQ) measurement, a Sidelink-Reference Signal-Signal to Noise Ratio (S-RS-SINR) measurement, a Sidelink-Received Signal Strength Indicator (S-RSSI), and a bit error ratio (BER).

In another embodiment, assigning the sidelink status based on the obtained channel quality measurement data includes comparing the obtained channel quality measurements to at least one threshold, each of the at least one threshold indicative of a certain sidelink status level. In another embodiment, the method further includes identifying a composite channel quality measurement based on the obtained channel quality measurement data, the composite channel quality measurement obtained by at least one of majority decision, consensus decision, logical combination of relations between individual measurements, arithmetic combination of individual measurements, comparison between measurements, and comparison between measurements and at least one threshold.

In another embodiment, the channel quality measurement data of the ITS sidelink is obtained from the wireless device. In another embodiment, the assigned sidelink status indicates a change in the status of the ITS sidelink. In another embodiment, detecting the change in the status includes comparing a previous status to a currently determined status. In another embodiment, the method further includes providing a feedback indicator based on the sidelink status.

In another embodiment, if it is determined that a change in the ITS sidelink status is from a less reliable level to a more reliable level, the method further includes delaying the providing of the feedback indicator by a predetermined amount of time, and if it is determined that a change in the ITS sidelink status is from a more reliable level to a less reliable level, further includes providing the feedback indicator without a delay. In another embodiment, the channel quality measurement data of the ITS sidelink is obtained with a varying occurrence depending on a mobility state of the wireless device. In another embodiment, the mobility state of the wireless device includes at least one of a speed of the wireless device, a direction of movement of the wireless device, a change in the speed of the wireless device, a change in the direction of the movement of the wireless device, and at least one of a trajectory and path of movement of the wireless device.

According to another aspect of the disclosure, a network node for determining a status of an ITS sidelink in a communication network is provided. The network node includes a communications interface configured to obtain channel quality measurement data of the ITS sidelink, and processing circuitry including a memory and a processor, the memory in communication with the processor, the memory having instructions that, when executed by the processor, configure the processor to assign a sidelink status based on the obtained channel quality measurements, and cause the communications interface to notify a wireless device in the communication network of the assigned sidelink status.

In an embodiment of this aspect, the communications interface is further configured to transmit at least one of the obtained channel quality measurement data and the assigned sidelink status to at least one of another network node and at least one other wireless device. In another embodiment, the sidelink status indicates two or more levels of the status of the ITS sidelink, the levels including, reliable and unreliable. In another embodiment, the assigned sidelink status indicates that the status of the ITS sidelink is one of an ITS sidelink operation is allowable, an ITS sidelink operation is not allowable, an ITS sidelink operation is allowable with limited reliability, the ITS sidelink is currently available, the ITS sidelink is of a medium quality, and the ITS sidelink is of a high quality.

In another embodiment, the assigned sidelink status indicates that the status of the ITS sidelink is one of a low ITS sidelink quality, a medium ITS quality, and a high ITS sidelink quality. In another embodiment, In another embodiment, the channel quality measurement data includes at least one of a Channel Occupancy Rate (COR) measurement, a Channel Busy Ratio (CBR) measurement, a Radio Link Monitoring (RLM) measurement, a Sidelink-Reference Signal Received Power (S-RSRP) measurement, a Sidelink-Reference Signal Received Quality (S-RSRQ) measurement, a Sidelink-Reference Signal-Signal to Noise Ratio (S-RS-SINR) measurement, a Sidelink-Received Signal Strength Indicator (S-RSSI), and a bit error ratio (BER).

In another embodiment, assigning the sidelink status based on the obtained channel quality measurement data includes comparing the obtained channel quality measurements to at least one threshold, each of the at least one threshold indicative of a certain sidelink status level. In another embodiment, the processor is further configured to identify a composite channel quality measurement based on the obtained channel quality measurement data, the composite channel quality measurement obtained by at least one of majority decision, consensus decision, logical combination of relations between individual measurements, arithmetic combination of individual measurements, comparison between measurements, and comparison between measurements and at least one threshold.

In another embodiment, the channel quality measurement data of the ITS sidelink is obtained from the wireless device. In another embodiment, the assigned sidelink status indicates a change in the status of the ITS sidelink. In another embodiment, detecting the change in the status includes comparing a previous status to a currently determined status. In another embodiment, the communications interface is further configured to provide a feedback indicator based on the sidelink status. In another embodiment, if it is determined that a change in the ITS sidelink status is from a less reliable level to a more reliable level, the processor is further configured to delay the providing of the feedback indicator by a predetermined amount of time, and if it is determined that a change in the ITS sidelink status is from a more reliable level to a less reliable level, the processor is further configured to provide the feedback indicator without a delay.

In another embodiment, the channel quality measurement data of the ITS sidelink is obtained with a varying occurrence depending on a mobility state of the wireless device. In another embodiment, the mobility state of the wireless device includes at least one of a speed of the wireless device, a direction of movement of the wireless device, a change in the speed of the wireless device, a change in the direction of the movement of the wireless device, and at least one of a trajectory and path of movement of the wireless device.

According to another aspect of the disclosure, a wireless device configured to provide notification of a status of an ITS sidelink in a communication network is provided. The method includes a communications interface module configured to obtain channel quality measurement data of the ITS sidelink, and a sidelink status assignment module configured to assign a sidelink status based on the obtained channel quality measurements and cause the provision of a feedback indicator based on the sidelink status.

According to another aspect of the disclosure, a network node for determining a status of an ITS sidelink in a communication network is provided. The network node includes a communications interface module configured to obtain channel quality measurement data of the ITS sidelink, and a sidelink status assignment module configured to assign a sidelink status based on the obtained channel quality measurements and cause the communications interface further to notify a wireless device in the communication network of the assigned sidelink status.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
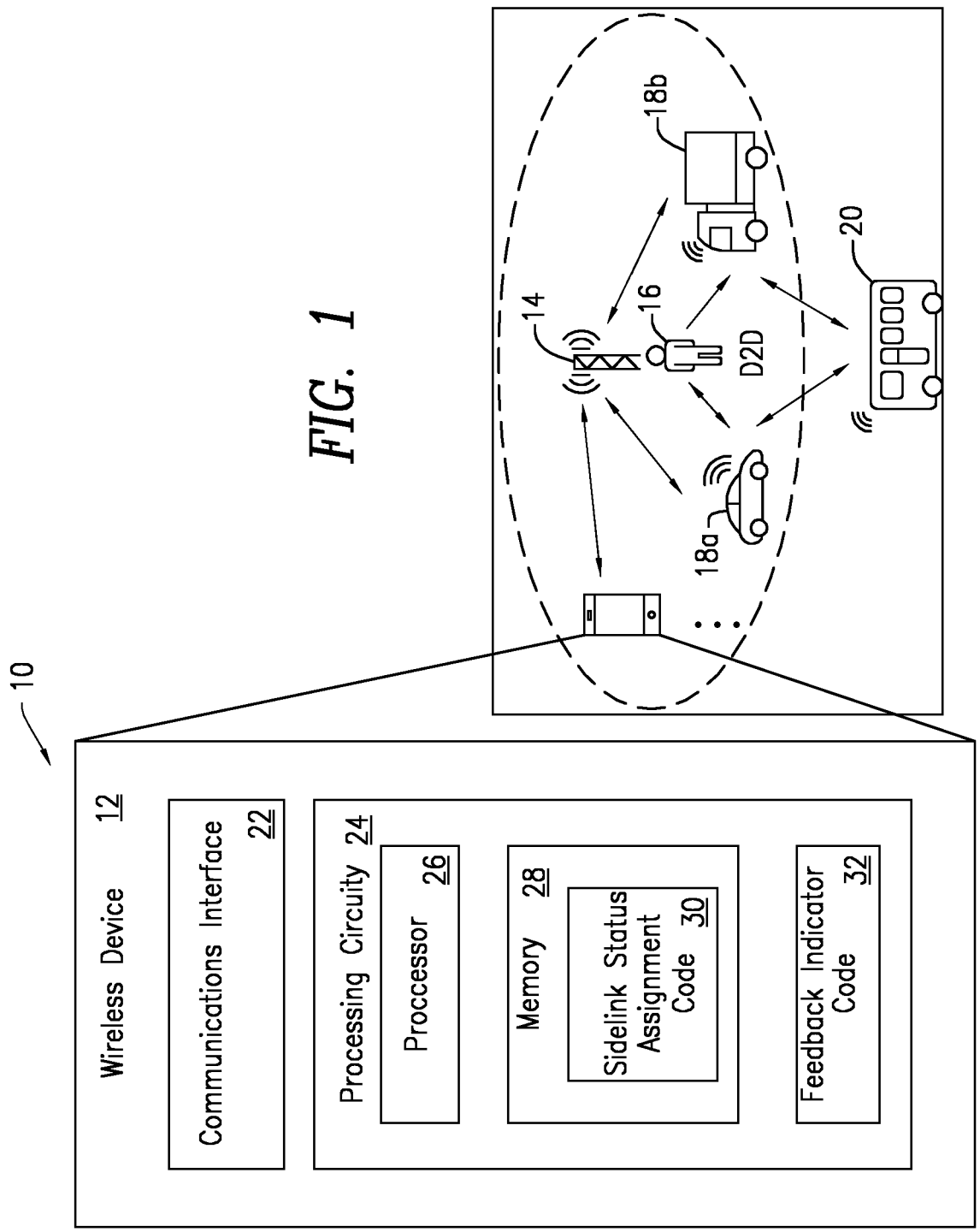
FIG. 1 is a diagram illustrating V2x scenarios in a communication network.

The present disclosure provides a method, network node, and wireless device, configured to provide notification to the driver of a vehicle of the status of an ITS sidelink in a communication network, where the notification provides an indication as to the reliability of the sidelink channel. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

Some embodiments advantageously provide a method, network node, and wireless device for measuring and/or estimating the channel occupancy rate of the ITS channel (e.g., by using such parameters as, for example, channel busy ratio measurement, load measurement, or any other similar measurement that reveals information on how often the channel is busy or when the channel is busy, etc.). Based on this estimate, the wireless device or the network node performs processing to determine the ITS channel availability which may result in two or more values. The result is then communicated to the driver of the vehicle in one or more of a variety of different ways depending on the actual result. By notifying the driver of the vehicle in this fashion, accidents involving the vehicle and other proximate vehicles can be avoided.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Before describing the details of the disclosure, some generalizations are described. In some embodiment a term "network node" is used. An example of a network node could be a more general term and can correspond to any type of radio network node or any network node, which communicates with a wireless device and/or with another network node. Examples of network nodes are NodeB, base station (BS), multi-standard radio (MSR) radio node such as a MSR BS, eNodeB, gNodeB, MeNB, SeNB, network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), core network node (e.g., mobile switching center (MSC), mobility management entity (MME), etc.), operation and maintenance (O&M), operation support system (OSS), self-organizing network (SON), positioning node (e.g., evolved serving mobile location center (E-SMLC)), minimization of drive test (MDT), etc.

In some embodiments generic terminology, "radio network node" or simply "network node (NW node)", is used. Such a node can be any kind of network node which may include a base station, radio base station, base transceiver station, base station controller, network controller, evolved Node B (eNB), Node B, relay node, access point, radio access point, Remote Radio Unit (RRU) Remote Radio Head (RRH), etc.

A non-limiting term "wireless device" is used herein and refers to any type of wireless device communicating with a network node and/or with another wireless device in a cellular or mobile communication system. Examples of wireless devices are user equipment (UE), target device, device to device (D2D) wireless device, machine type wireless device or wireless device capable of machine to machine (M2M) communication, PDA, Tablet, mobile terminals, smart phone, laptop embedded equipped (LEE), laptop mounted equipment (LME), USB dongles, etc.

In some embodiments, the non-limiting term wireless access network (WAN) or radio access network (RAN) node is used. The WAN node can be a wireless device (e.g., a D2D wireless device) or a network node (e.g., access point, base station, eNB, etc.). The WAN node is also interchangeably called as cellular node, NW source node, etc.

The embodiments described herein may be for LTE, however the embodiments are also applicable to any RAT or multi-RAT system, where the wireless device receives and/ or transmit signals (e.g., data), e.g., LTE frequency division duplex (FDD)/time division duplex (TDD), wideband code division multiple access (WCDMA)/high speed packet access (HSPA), global system for mobile communications (GSM)/GSM EDGE radio access network (GERAN), Wi Fi, wireless local area network (WLAN), CDMA2000, 5$^{th}$ Generation (5G), New Radio (NR), etc.

The term "radio access technology" (RAT), may refer to any RAT, e.g., universal terrestrial radio access (UTRA), evolved-universal terrestrial radio access (E-UTRA), narrow band internet of things (NB-IoT), WiFi, Bluetooth, next generation RAT (NR), 4G, 5G, etc. Any of the first and the second nodes may be capable of supporting a single or multiple RATs.

A wireless device may be configured to operate in carrier aggregation (CA) implying aggregation of two or more carriers in at least one of downlink (DL) and uplink (UL) directions. With CA, a wireless device can have multiple serving cells, wherein the term 'serving' herein means that the wireless device is configured with the corresponding serving cell and may receive from and/or transmit data to the network node on the serving cell, e.g., on a primary cell (PCell) or any of the secondary cells (SCells). The data is transmitted or received via physical channels, e.g., physical downlink shared channel (PDSCH) in DL, physical uplink shared channel (PUSCH) in UL, etc. A component carrier (CC) also interchangeably called as carrier or aggregated carrier, primary component carrier (PCC) or secondary component carrier (SCC) is configured at the wireless device by the network node using higher layer signaling, e.g., by sending radio resource control (RRC) configuration message to the wireless device. The configured component carrier (CC) is used by the network node for serving the wireless device on the serving cell (e.g., on PCell, PSCell, SCell, etc.) of the configured CC. The configured CC is also used by the wireless device for performing one or more radio measurements (e.g., reference signal received power (RSRP), reference signal received quality (RSRQ), etc.) on the cells operating on the CC, e.g., PCell, SCell or PSCell and neighboring cells.

The term "signal" used herein can be any physical signal or physical channel. Examples of physical signals are reference signal such as primary synchronization signal (PSS), secondary synchronization signal (SSS), cell-specific reference signal (CRS), positioning reference signal (PRS), etc. The term "physical channel" (e.g., in the context of channel reception) used herein is also called "channel." Examples of physical channels are MIB, physical broadcasting channel (PBCH), narrowband physical broadcasting channel (NPBCH), physical downlink control channel (PDCCH), physical downlink shared channel (PDSCH), such, short physical downlink shared channel (sPDSCH), short physical upload control channel (sPUCCH), short physical uplink shared channel (sPUSCH), machine type communications (MTC) physical downlink control channel (MPDCCH), narrowband physical downlink control channel (NPDCCH), narrowband physical downlink shared channel (NPDSCH), evolved-physical downlink control channel (E-PDCCH), physical uplink shared channel (PUSCH), physical uplink control channel (PUCCH), narrowband physical uplink shared channel (NPUSCH), etc.

The term "radio measurement" used herein may include any measurement based on receiving a radio signal or channel, e.g., power-based measurements such as received signal strength (e.g., Sidelink-Received Signal Strength Indicator (S-RSSI), RSRP or CSI-RSRP) or quality measurements (e.g., RSRQ, Reference Signal (RS)-Signal-to-Interference plus Noise Ratio (SINR), Internet of Things (Iot), Signal to Noise Ratio (SNR)); cell identification;

synchronization signals measurements; angle measurements such as angle of arrival (AOA); timing measurements such as Rx-Tx, Round Trip Time (RTT), Reference Signal Time Difference (RSTD), TOA, TDOA, timing advance; throughput measurements; channel quality measurements such Channel Status Information (CSI), Channel Quality Indicator (CQI), Pre-coding Matrix Indicator (PMI), channel measurement (e.g., Master Information Block (MIB), System Information Blocks (SIBs), System Information (SI), Cell Global Identity (CGI) acquisitions, etc.). A measurement may be absolute, relative to a common reference or to another measurement, composite measurement. A measurement may be on one link or more than one links (e.g., RSTD, timing advance, RTT, relative RSRP, etc.). Measurements may also be differentiated by purpose and may be performed for one or more purposes, e.g., for one or more of: Radio Resource Management (RRM), minimization of Drive Test (MDT), Self-Organizing Network (SON), positioning, timing control or timing advance, synchronization. In a non-limited example, the invention may apply to any measurement such as described above.

The term "requirements" used herein may include any type of wireless device requirements related to wireless device measurements aka measurement requirements, RRM requirements, mobility requirements, positioning measurement requirements, etc. Examples of wireless device requirements related to wireless device measurements are measurement time, measurement reporting time or delay, measurement accuracy (e.g., RSRP/RSRQ accuracy), number of cells to be measured over the measurement time, etc. Examples of measurement time include L1 measurement period, cell identification time or cell search delay, cell global identity (CGI) acquisition delay, etc.

Referring now to the drawings, in which like reference designators refer to like elements, there is shown in FIGS. 1-6, an exemplary wireless device and network node, and methods performed by a wireless device and a network node for using a wireless communication network to provide notification of the status of an intelligent traffic system (ITS) sidelink to the occupants of a vehicle constructed in accordance with the principles of the present disclosure.

FIG. 1 illustrates a communication network 10, such as an LTE-based network, incorporating the principles of the present disclosure. It should be noted that the present disclosure is not limited to LTE network technologies specifically. The methods and arrangements disclosed herein may be applied to other communication network technologies. As shown in FIG. 1 and as discussed above, communication network 10 includes several V2x scenarios, including vehicle-to-vehicle (V2V), vehicle-to-pedestrian (V2P) and vehicle-to-infrastructure (V2I). In the V2V scenario, two or more vehicles are in communication with each other over one of several types of communication networks such as a cellular network, the Internet, application servers or the like. V2V communications allows the driver in one vehicle to warn drivers in other vehicles about roadside hazards and provide forward collision warnings.

Communication network 10 may include one or more wireless devices 12a-12n (collectively referred to herein as "wireless device 12," "V2V wireless device 12," or "V2x wireless device"). In FIG. 1, a single wireless device 12 is shown for simplicity. Similarly, although network node 14 is shown as a single node 14, it is contemplated that the functions described herein with respect to network node 14 may be divided or distributed among multiple network nodes 14. Wireless device 12 and network node 14 are configured to perform the processes described herein.

As used herein, wireless device 12 is not limited to a user equipment (UE). A wireless device 12 is any type of device that is configured or configurable for communication through wireless communication. Examples of such wireless devices are sensors, modems, smart phones, machine type communication (MTC) devices, i.e., machine to machine (M2M) devices, PDAs, iPADs, Tablets, smart phones, laptop embedded equipped (LEE), laptop mounted equipment (LME), USB dongles, etc. In communication network 10, two or more wireless devices 12 directly communicate with each other without having the payload traverse the backhaul network.

In cellular network assisted D2D communications, wireless devices 12 in the vicinity of each other can establish a direct radio link, i.e., a D2D bearer. While wireless devices 12 communicate over the D2D "direct" bearer, they also maintain a cellular connection with one or more network entities 14 such as their respective serving base station, for example, an LTE eNB. Network node 14 serves wireless devices 12 in a region of coverage of the network node 14.

The pedestrian 16 or any of the vehicles depicted in FIG. 1 may communicate with each other via one or more wireless devices 12. The pedestrian 16, vehicles 18a and 18b (collectively referred to as "vehicle 18") and vehicle 20 shown in FIG. 1 each may each include, have within or carry a wireless device 12. Also, the elements within the dashed oval in FIG. 1, e.g., wireless device 12, vehicles 18 and pedestrian 16, are able to directly communicate with network node 14 using a cellular communication link, while the elements outside the dashed oval, e.g., vehicle 20, do not directly communicate with the network node 14, and therefore communicate with other V2x elements via a sidelink.

Wireless device 12 includes a communications interface 22 for communicating with one or more other wireless devices 12, network nodes 14, and/or other elements in network 10. In one or more embodiments, communication interface 22 includes one or more transmitters, one or more receivers, and/or one or more communication interfaces. Wireless device 12 includes processing circuitry 24. In one embodiment, processing circuitry 24 includes processor 26 and memory 28. In addition to a traditional processor and memory, processing circuitry 24 may include integrated circuitry for processing and/or control, e.g., one or more processors and/or processor cores and/or FPGAs (Field Programmable Gate Array) and/or ASICs (Application Specific Integrated Circuitry). Processor 26 may be configured to access (e.g., write to and/or reading from) memory 28, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 28 may be configured to store code executable by processor 26 and/or other data, e.g., data pertaining to communication.

Processing circuitry 24 may be configured to control any of the methods and/or processes described herein and/or to cause such methods and/or processes to be performed, e.g., by wireless device 12. Processor 26 corresponds to one or more processors 26 for performing wireless device 12 functions described herein. Wireless device 12 includes memory 28 that is configured to store data, programmatic software code and/or other information described herein.

In one or more embodiments, memory 28 is configured to store sidelink status assignment code 30 and feedback indicator code 32. For example, store sidelink status assignment code 30 and feedback indicator code 32 include instructions that, when executed by processor 26, causes processor 26 to perform some or all of the processes discussed in detail with respect to FIG. 3 and embodiments discussed herein.

Figure 2:
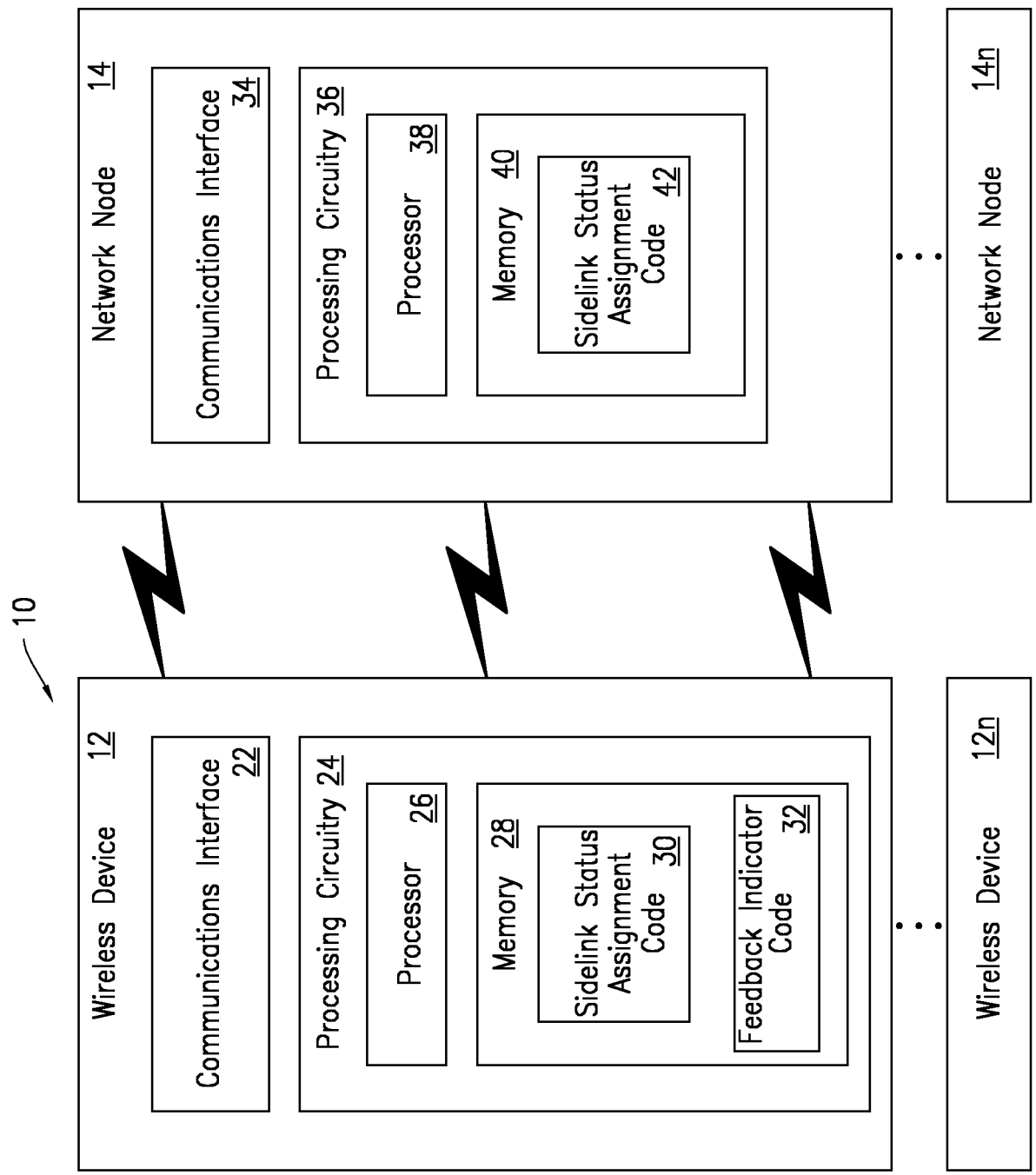
FIG. 2 is a block diagram illustrating communication between a wireless device and a network node in accordance with the principles of the present disclosure.

FIG. 2 is a block diagram illustrating communication between wireless device 12 and network node 14. Network node 14 includes communication interface 34 for communicating with one or more other network nodes 14, wireless device 12, and/or other elements in network 10. In one or more embodiments, communication interface 34 includes one or more transmitters, one or more receivers and/or one or more communication interfaces.

Network node 14 includes processing circuitry 36. Processing circuitry 36 includes processor 36 and memory 40. In addition to a traditional processor and memory, processing circuitry 36 may include integrated circuitry for processing and/or control, e.g., one or more processors and/or processor cores and/or FPGAs (Field Programmable Gate Array) and/or ASICs (Application Specific Integrated Circuitry). Processor 38 may be configured to access (e.g., write to and/or reading from) memory 40, which may include any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 40 may be configured to store code executable by processor 38 and/or other data, e.g., data pertaining to communication, e.g., configuration and/or address data of nodes, etc.

Processing circuitry 36 may be configured to control any of the methods and/or processes described herein and/or to cause such methods and/or processes to be performed, e.g., by network node 14. Processor 36 corresponds to one or more processors 36 for performing network node 14 functions described herein. Network node 14 includes memory 40 that is configured to store data, programmatic software code and/or other information described herein. In one or more embodiments, memory 40 is configured to store sidelink status assignment code 42. For example, store sidelink status assignment code 42 includes instructions that, when executed by processor 38, causes processor 38 to perform some or all of the processes discussed in detail with respect to FIG. 4 and embodiments discussed herein.

In the embodiments disclosed herein, there are at least two nodes or radio nodes 12; one transmitting node, rn1 (or first node), which at least transmits signals and one receiving node, rn2 (or second node), which at least receives signals transmitted by the rn1 node. There can be one or more transmitted signals, e.g., data channels such as PSDCH, a shared channel such as PSSCH, and a reference signal such as demodulation reference signal (DMRS), etc. The rn2 node may receive one or plurality of signals transmitted by the rn1 node. The received signals are typically used by the rn2 node for one or more of: estimating a channel, receiving the data and/or control information, performing measurements to find out about the conditions (e.g., road conditions, weather, speed, presence of other devices in its vicinity, etc.). In one exemplary embodiment, the first node rn1 and the second node rn2 are both wireless devices 12. In another exemplary embodiment, the first node rn1 is a wireless device 12 and the second node rn2 is a network node 14. In yet another exemplary embodiment, the first node rn1 is a network node 14 and the second node rn2 is a wireless device 12. The methods disclosed herein are applicable to any of these examples. An example of a wireless device 12 in this case is a ProSe wireless device 12, a V2V wireless device 12, a V2x wireless device 12, etc. More examples are described below.

In the case where the first node is a network node 14, it is assumed that the network node 14 serves a first cell, say PCell, or, serving cell. The V2V capable wireless device 12 can be pre-configured by the PCell with V2V resources for V2V operation of the V2V wireless device 12 on a sidelink. The pre-configured V2V resources may be used by the V2V wireless device 12 when operating in ONC. In addition, the resources for operating V2V services can also be chosen by the V2V wireless device 12 itself from a (predefined) resource pool, or the resources may be de-selected and assigned by the serving network node 14 directly.

The sidelink may typically operate on a carrier of the PCell (i.e., the serving carrier frequency or intra-frequency carrier). The sidelink may also be configured for V2V operation on a non-serving carrier of the V2V wireless device 12. The non-serving carrier can be inter-frequency carrier, inter-RAT carrier or any carrier which is not configured as the serving carrier. For example, the non-serving carrier can be the one configured as inter-frequency carrier frequency for doing WAN measurements or carrier frequency only configured for V2V operation, i.e., a dedicated V2V carrier.

In some embodiments, the V2V wireless device 12 may also be configured with another cell that is configurable upon need basis, for example, SCell1. In some embodiments, the SCell1 may be served by a second network node 14. The embodiments apply regardless of whether PCell and one or more SCells are served by the same or different network nodes 14. In this case, the V2V wireless device 12 can be pre-configured with V2V resources for V2V operation on a sidelink which may operate on carrier of PCell or of SCell or of any non-serving carrier. The V2V wireless device 12 can be pre-configured with V2V resources for ProSe/V2V/sidelink operation on a plurality of sidelinks, e.g., carriers of PCell, SCell1 and a non-serving carrier.

The network node 14 may also configure the V2V wireless device 12 with a third cell, SCell2, on a different carrier on need basis. The embodiments presented in this disclosure may also apply to a V2V wireless device 12 configured with carrier aggregation (CA) with any number of SCells and/or multicarrier operation with any number of carriers.

In some embodiments, the wireless device 12 may be configured with PCell and PSCell or with PCell, PSCell and one or more SCells such as in dual connectivity. The configured cells are wireless device specific and the embodiments included in this disclosure may be applied on a wireless device basis on each configured cell.

The V2V wireless device 12 may also be configured with one or more carriers for doing measurements on the cells of the configured carriers. The wireless device 12 may be configured with such carriers for measuring in idle state and/or in connected state.

The V2V wireless device 12 may be configured with at least one serving cell (e.g., PCell) on carrier f1. As an example, f1 can be a frequency belonging to any LTE frequency band.

The V2V wireless device 12 is configured to directly communicate with at least one another V2V wireless device 12 on carrier f2. For example, two or more V2V wireless devices 12 may communicate with each other on f2 using half duplex mode e.g., in TDD. As an example, f2 can be a frequency dedicated for V2V operation, e.g., f2 can belong to an intelligent transport system (ITS) band in 5 GHz range.

In one exemplary implementation, the V2V wireless device 12 may be configured with both f1 and f2, i.e., perform both cellular and V2V operations.

In another exemplary implementation, the V2V wireless device 12 may be configured with only f2, i.e., perform only V2V operations.

An out of coverage (remote) V2V wireless device 12 an still be involved in V2V operation. In this case, the remote wireless device 12 may need to assess the link quality between itself and possible V2V wireless device 12 candidate(s). The link between the two V2V wireless devices 12 is also known as a PC5 link or PC5 connection. For this purpose, the remote wireless device 12 may measure on the reference symbols (e.g., sidelink synchronization signal (SLSS)) transmitted by the other V2V wireless device 12 candidate(s). The wireless device 12 may also measure on the DMRS signals of the PSBCH channel. An example of a reference symbol measurement is an S-RSRP measurement.

Figure 3:
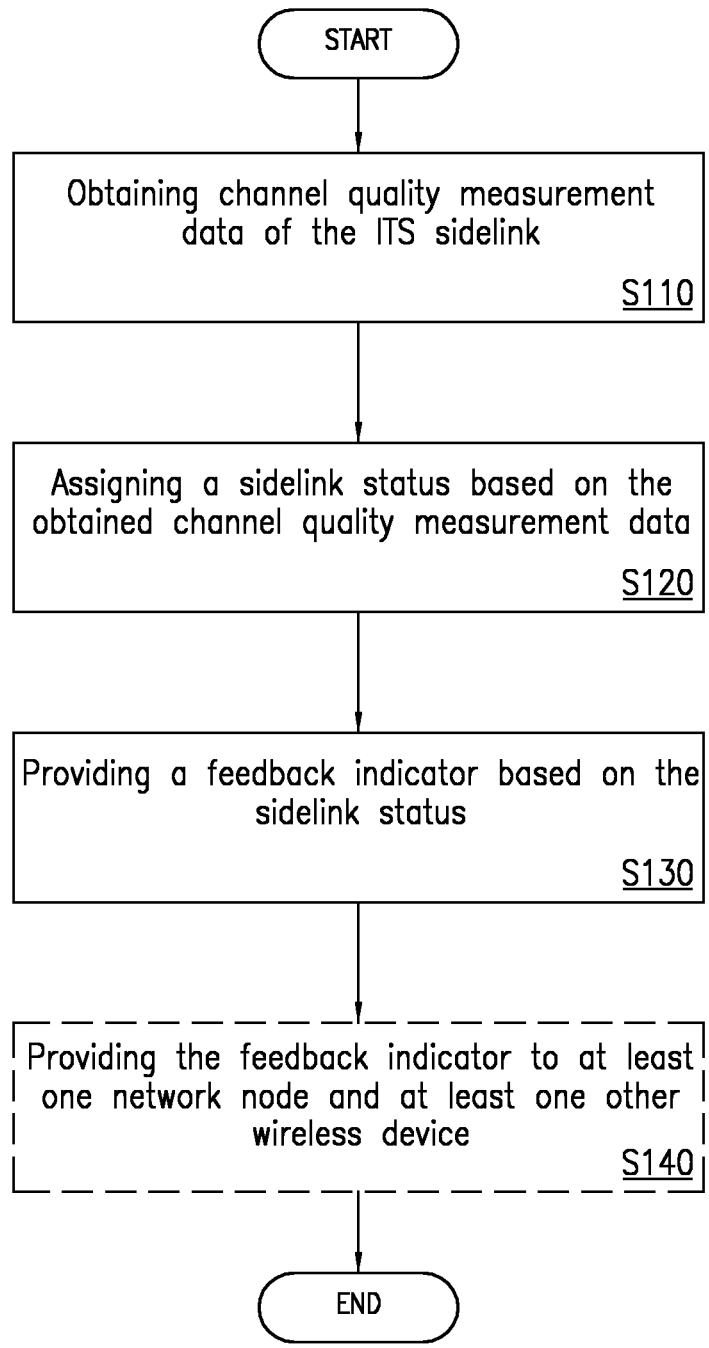
FIG. 3 is a flow diagram illustrated an exemplary method performed by a wireless device for providing notification of a status of an ITS sidelink in a communication network in accordance with the principles of the present disclosure.

FIG. 3 is a flow diagram illustrating an exemplary method performed by wireless device 12. The method performed by wireless device 12 is a method for using wireless device 12 to provide notification of a status of an intelligent traffic system (ITS) sidelink in communication network 10. In one embodiment, the method includes obtaining, by communications interface 22, information such as channel quality measurement data of the ITS sidelink (Block S110). In one embodiment, V2V wireless device 12 obtains the channel quality measurement data by carrying out load or congestion measurements periodically to assess the occupancy of the sidelink carrier frequency, e.g., the 5.9 GHz ITS band. The measurement may, for example, be based on the channel busy ratio (CBR), some other kind of metric(s) that can be mapped to how busy is the channel, or a combination thereof. The measurement may result in a value that is bounded by a lower bound that represents low load/no congestion and an upper bound that represents high load/congestion. There may be two or more values in the range, where additional values represent intermediate load levels.

Combinations of the metrics into a single metric may be also achieved, e.g., by deciding the final metric based on any or a combination of:
  majority decision
  consensus decision
  logical combinations of relations between individual metrics
  arithmetic combination of individual metrics
  comparisons between metrics, and/or between metrics and thresholds Moreover, wireless device 12 could adapt the frequency of determining such congestion information based on the wireless device 12 speed and/or direction. For example, if the wireless device 12 is moving very fast, i.e., faster than a certain threshold speed, then it may be more desirable to estimate the channel more frequent compared to when the wireless device 12 speed is moving relatively slow, i.e., at or below a certain threshold speed. Also, the wireless device 12 could use more resources (e.g., more subframes) to estimate the channel when the wireless device 12 speed is very high and when there are other vehicles in close proximity. If the wireless device 12 is moving towards other vehicles, then it can be more important to evaluate the channel occupancy rate compared to when the wireless device 12 is moving toward a direction where there are no other vehicular wireless devices 12.

Referring again to FIG. 3, processor 26 in conjunction with sidelink assignment code 30 then determines or assigns a sidelink status based on the obtained channel quality measurement data (Block S120). In one embodiment, V2x wireless device 12 assigns the sidelink status by comparing the value of the metric resulting from Block S110 with a set of thresholds to determine the load conditions on the channel. In case more than two values can be attained from the measurement in Block S110, the set of thresholds may include multiple thresholds, each threshold representing a load condition, e.g., {0, 50, 100%}.

The load condition may then be mapped to one of the exemplary states (of which there will be at least two but may be more than three):
  No ITS sidelink is possible/available now (i.e., ITS sidelink is of a low quality)
  ITS sidelink is of medium/average quality
  ITS sidelink quality is good (i.e., ITS sidelink quality is high)

The mapping does not have to be linear with respect to the measured load conditions. For instance, "No ITS is possible/available now" may represent a load condition over 90%, "ITS is of medium/average quality" may represent a load condition between 60 and 90%, and "ITS quality is good" may represent a load condition that is below 60%. The exact mapping is determined based on the probability that a hypothetic message will be possible to broadcast within a certain time frame T1, e.g., 200 ms. The time frame may be derived by studying the latencies involved from a situation that arises until a broadcasted message about the situation has been received by nearby vehicles, e.g., a "Forward collision warning."

The time frame T1 may be dynamic and depend on the speed and the distance to proximal vehicles. Therefore, a vehicle moving at low speed and/or with a large distance between it and vehicles around it can accept that it takes longer time to broadcast a "Forward collision warning" than a vehicle moving at higher speed and/or with shorter distance between it and vehicles around it.

Moreover, the time frame T1 may depend on the breaking capabilities of the vehicle, which may be influenced by payload (i.e., no load, partial load, full load) and road conditions (dry, wet, ice; i.e. friction).

The mapping can also be done based on history or past statistics, e.g., when the wireless device 12 speed is X1 km/h, thresholds A1 and A2 are used to determine the quality/availability. When the wireless device 12 speed is X2 km/h, thresholds B1, B2, and B3 are used to determine the congestion level.

The mapping can also be based on predefined thresholds or rules. For example, it can be specified that when the channel busy ratio (CBR) is above a certain threshold, thr1, the channel is said to be fully occupied. When the CBR is between two other thresholds, thr2 and thr3, the channel is said to be available with poor quality, etc.

The mapping can also include a combination of channel busy ratio related measurements with signal strength measurements (SRSRP) or load measurement (e.g., SRSRQ if any). In one example, if the channel is determined to be busy, but the SRSRP measurement indicates a poor signal strength to the nearest vehicle, then it may be possible to use different threshold values compared with when the SRSRP measurement is high.

Referring again to FIG. 3, processor 26 in conjunction with feedback indicator code 32 conveys the outcome of the assigned sidelink status by providing a feedback indicator based on the sidelink status (Block S130). In one embodiment, wireless device 12 conveys information regarding the ITS status to the driver via either or a combination of:
  visual;
  audial; and/or
  haptic feedback.

Visual feedback may, for example, include any or a combination of:
- messages and/or symbols displayed on a screen or projected onto the windshield; and
- indicator light(s)

Audial feedback may, for example, include any or a combination of:
- messages stating the status verbally; and
- sounds (e.g., tones, beeps)

Haptic feedback may, for example, include any or a combination of:
- vibrating steering wheel;
- vibrating zone(s) of the driver's seat;
- vibrating pedal(s); and
- push-back of gas pedal In order to avoid too many indications, a hysteresis may be applied where, for example, a transition to a lower state (e.g., "No ITS is possible/available now") occurs as soon as such state is detected, but where a transition to a higher state (e.g., "ITS is of medium/average quality") occurs first after having detected that state or higher states (e.g., "ITS is of medium/average quality" and "ITS quality is good") consistently over a time frame T2.

In some embodiments, the feedback indicator indicates two or more levels of the status of the ITS sidelink, the levels including, reliable and unreliable.

In some embodiments, the feedback indicator indicates that the status of the ITS sidelink is one of an ITS sidelink operation is allowable, an ITS sidelink operation is not allowable, an ITS sidelink operation is allowable with limited reliability, the ITS sidelink is currently available, the ITS sidelink is of a medium quality, and the ITS sidelink is of a high quality In some embodiments, the feedback indicator indicates a change in the status of the ITS sidelink.

In some embodiments, detecting the change in the status of the ITS sidelink includes comparing a previous status to a currently determined status.

In some embodiments, if it is determined that the change in the ITS sidelink status is from a less reliable level to a more reliable level, processing circuitry 24 delays the providing of the feedback indicator by a predetermined amount of time, and if it is determined that the change in the ITS sidelink status is from a more reliable level to a less reliable level, the feedback indicator is provided without a delay.

In some embodiments, the channel quality measurement data includes at least one of a Channel Occupancy Rate (COR) measurement, a Channel Busy Ratio (CBR) measurement, a Radio Link Monitoring (RLM) measurement, a Sidelink-Reference Signal Received Power (S-RSRP) measurement, a Sidelink-Reference Signal Received Quality (S-RSRQ) measurement, a Sidelink-Reference Signal-Signal to Noise Ratio (S-RS-SINR) measurement, a Sidelink-Received Signal Strength Indicator (S-RSSI) and a bit error ratio (BER).

In some embodiments, assigning the sidelink status based on the obtained channel quality measurement data includes comparing the obtained channel quality measurement data to at least one threshold, each of the at least one threshold indicative of a certain sidelink status level.

In some embodiments, processing circuitry 24 identifies a composite channel quality measurement based on the obtained channel quality measurement data, the composite channel quality measurement obtained by at least one of majority decision, consensus decision, logical combination of relations between individual measurements, arithmetic combination of individual measurements, comparison between measurements, and comparison between measurements and at least one threshold.

In some embodiments, the feedback indicator includes at least one of a visual indicator, an audial indicator, and a haptic indicator.

In some embodiments, the feedback indicator includes at least one of the obtained channel quality measurement data of the ITS sidelink and the sidelink status.

In some embodiments, the channel quality measurement data of the ITS sidelink is obtained from network node 14.

In some embodiments, the feedback indicator is provided to at least one of at least one network node 14 and at least one other wireless device 12 (Block S140). In Block S140, wireless device 12 may inform, either implicitly or explicitly, another node, e.g., another wireless device 12 or a network node 14, about the determined information on channel occupancy. This information can include the channel occupancy measurement result, or a channel busy ratio result, and also may include the determined sidelink status. Examples of other nodes which receive the information are a radio network node (e.g., eNodeB, base station, access point, etc.), ProSe wireless devices, ProSe relay wireless devices, IoT devices, NB-IOT devices, core network nodes, positioning node or any other node used for dedicated services such as self-organizing network (SON) node. The other nodes to which the determined information is communicated could also be under operator control or third party control. The other nodes may also be the receiving node.

There are advantages in sharing the determined information with other nodes, e.g., network node 14 or wireless device 12. One advantage is that the same information or a portion of the information may be applicable to other nodes in the network 10, and in that case it can be reused. For example, the same information can be applicable or relevant for other vehicles in the same area or areas near the reporting wireless device 12, for example, when the distance to the reporting wireless device 12 is less than a certain distance.

A second advantage of sharing the determined information with other nodes is that estimating the channel occupancy related information (e.g., congestion control measurement, channel busy ratio measurement, etc.), and determining the sidelink carrier frequency availability status can be quite complex at times. By utilizing the features of the present disclosure, the sidelink carrier frequency status and availability can be determine in one place and at one time, and then signaled to other nodes in the network 10. In this fashion, processing in the different nodes in the network can be reduced.

In addition, the signaled information could also include the thresholds or the levels used to determine the sidelink carrier frequency availability status. For example, the threshold used to determine when the sidelink carrier is not available, when it is available with medium quality, and/or when it is available with good quality. Thus, the nodes receiving this information may utilize the information without having to perform the obtaining of the channel quality data, the processing of the data and calculations of the sidelink status levels themselves.

In some embodiments, the channel quality measurement data of the ITS sidelink is obtained with a varying occurrence depending on a mobility state of wireless device 12.

In some embodiments, the mobility state of wireless device 12 includes at least one of a speed of wireless device 12, a direction of movement of wireless device 12, a change in the speed of wireless device 12, a change in the direction of the movement of wireless device 12, and at least one of a trajectory and path of movement of wireless device 12.

Figure 4:
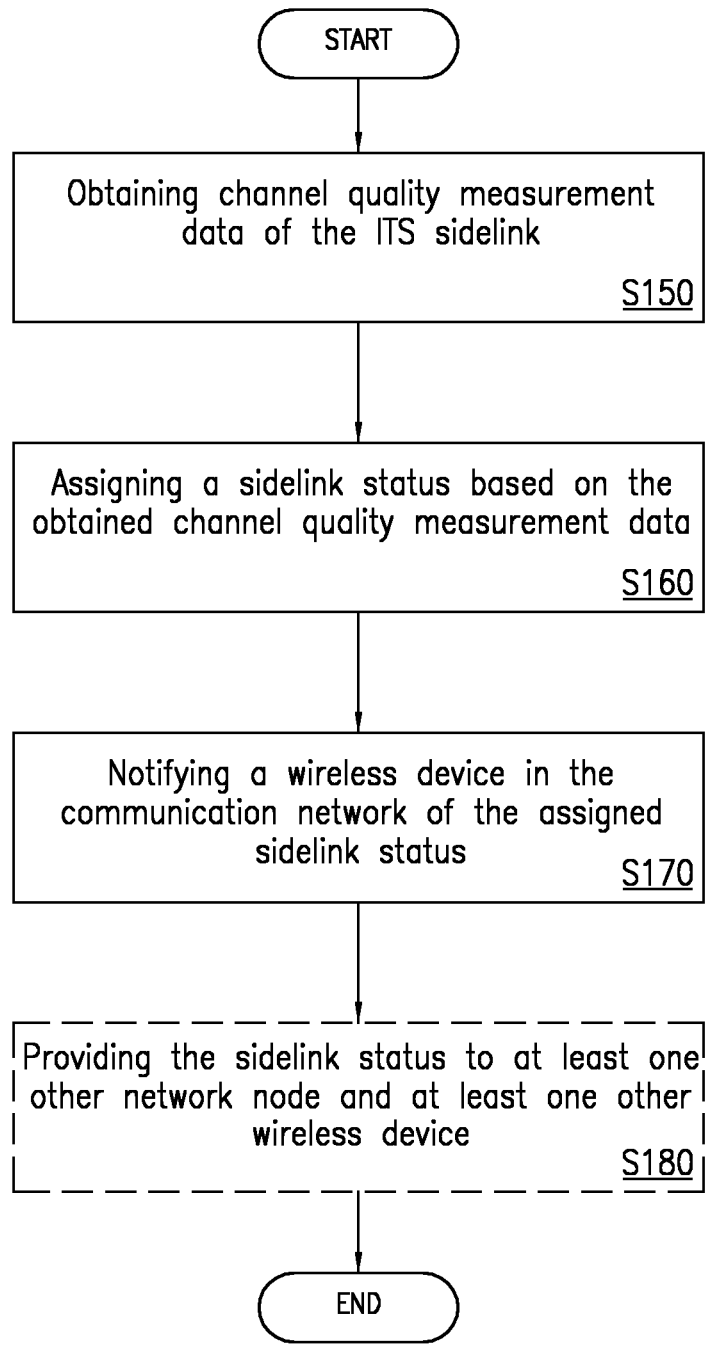
FIG. 4 is a flow diagram illustrated an exemplary method performed by a network node for providing notification of a status of an ITS sidelink in a communication network in accordance with the principles of the present disclosure.

FIG. 4 is a flow diagram illustrating an exemplary method performed by network node 14. The method performed in network node 14 is a method for determining a status of an intelligent traffic system (ITS) sidelink in a communication network. The method includes obtaining, by processor 38 in conjunction with sidelink status assignment code 42, channel quality measurement data of the ITS sidelink (Block S150).

In Block S150, the network 10 may receive the information on channel occupancy of sidelink carrier frequency reported from the vehicular wireless devices 12 or other nodes in the network 10. Examples of other nodes which are radio network nodes are an eNodeB, a base station, an access point, ProSe wireless devices, ProSe relay wireless devices, IoT devices, NB-IOT devices, core network nodes, positioning nodes or any other node used for dedicated services such as self-organizing network (SON) node.

In addition, the network node 14 may also perform such measurements (channel occupancy related measurement, such as channel busy ratio, load measurement, etc.) and estimate the channel itself. In this embodiment, the methods used to obtain these measurements and estimate the channel may be similar to those described above in the wireless device 12 embodiment. Thus, for example, network node 14 may obtain the channel quality measurement data by carrying out load or congestion measurements periodically to assess the occupancy of the sidelink carrier frequency, e.g., the 5.9 GHz ITS band. The measurement may, for example, be based on the channel busy ratio (CBR), some other kind of metric(s) that can be mapped to how busy is the channel, or a combination thereof. The measurement may result in a value that is bounded by a lower bound that represents low load/no congestion and an upper bound that represents high load/congestion. There may be two or more values in the range, where additional values represent intermediate load levels.

Further, network node 14 could adapt the frequency of determining such congestion information based on the wireless device 12 speed and/or direction. For example, if the wireless device 12 is moving very fast, i.e., faster than a certain threshold speed, then it may be more desirable to estimate the channel more frequent compared to when the wireless device 12 speed is moving relatively slow, i.e., at or below a certain threshold speed. Also, the wireless device 12 could use more resources (e.g., more subframes) to estimate the channel when the wireless device 12 speed is very high and when there are other vehicles in close proximity. If the wireless device 12 is moving towards other vehicles, then it can be more important to evaluate the channel occupancy rate compared to when the wireless device 12 is moving toward a direction where there are no other vehicular wireless devices 12.

Moreover, network node 14 may use additional information reported by the V2V wireless device 12 to improve the estimate. Examples of such information are reported S-RSRP measurement from the wireless device 12. If the SRSRP measurement reported is strong or greater than a certain threshold, then this can be interpreted that there are other V2V wireless devices 12 in close proximity of this particular wireless device 12. In another example, if the wireless device has reported that it has detected a certain number of other V2V wireless devices 12 (e.g., using detected SLSS, PSSS, SSSS, etc.), the determination of channel occupancy can be done more frequently or by using more resources or be performed with a higher priority.

Referring again to FIG. 4, by processor 38 in conjunction with sidelink status assignment code 42, assigns or determines a sidelink status based on the obtained channel quality measurement data (Block S160). The assigning of the sidelink status based on the obtained quality measurement data may be accomplished in the same manner as described above in the wireless device 12 embodiment. For example, network node 1 can compare the value of the metric resulting from Block S150 with a set of thresholds to determine the load conditions on the channel. In case more than two values can be attained from the measurement, the set of thresholds may include multiple thresholds, each threshold representing a load condition, e.g., {0, 50, 100%}.

The load condition is then mapped to one of the exemplary states (of which there will be at least two but may be more than three):
  No ITS is possible/available now
  ITS is of medium/average quality
  ITS quality is good The mapping does not have to be linear with respect to the measured load conditions. For instance, "No ITS is possible/available now" may represent a load condition over 90%, "ITS is of medium/average quality" may represent a load condition between 60 and 90%, and "ITS quality is good" may represent a load condition that is below 60%. The exact mapping is determined based on the probability that a hypothetic message will be possible to broadcast within a certain time frame T1, e.g. 200 ms. The time frame may be derived by studying the latencies involved from a situation that arises until a broadcasted message about the situation has been received by nearby vehicles, e.g., a "Forward collision warning."

The time frame T1 may be dynamic and depend on the speed and the distance to proximal vehicles. Therefore, a vehicle moving at low speed and/or with a large distance between it and vehicles around it can accept that it takes longer time to broadcast a "Forward collision warning" than a vehicle moving at higher speed and/or with shorter distance between it and vehicles around it.

Moreover the time frame T1 may depend on the breaking capabilities of the vehicle, which may be influenced by payload (i.e., no load, partial load, full load) and road conditions (dry, wet, ice; i.e. friction).

The mapping can also be done based on history or past statistics, e.g., when the wireless device speed is X1 km/h, thresholds A1 and A2 are used to determine the quality/availability. When the wireless device speed is X2 km/h, thresholds B1, B2, and B3 are used to determine the congestion level.

The mapping can also be based on predefined thresholds or rules. For example, it can be specified in the specification that when the channel busy ratio (CBR) is above a certain threshold, thr1, the channel is said to be fully occupied. When the CBR is between two other thresholds, thr2 and thr3, the channel is said to be available with poor quality, etc.

The mapping can also include combination of channel busy ratio related measurements with signal strength measurements (SRSRP) or load measurement (e.g., SRSRQ if any). In one example, if the channel is determined to be busy, but the SRSRP measurement indicates a poor signal strength to the nearest vehicle, then it may be possible to use different threshold values compared with when the SRSRP measurement is high.

Referring again to FIG. 4, communications interface 34 then conveys the outcome of the determined sidelink status by notifying wireless device 12 in the communication network 10 of the assigned sidelink status (Block S170). In some embodiments, network node 14 communicates the determined information on sidelink carrier frequency occupancy to the V2V wireless device 12. Examples of the determined information provided to the wireless device 12 may include one or more of the following:

Sidelink carrier frequency occupancy, for example, sidelink channel busy ratio, or any other similar measurement result Information on the determined status of sidelink channel availability, e.g., the sidelink channel is available a certain percentage of the time (i.e., 90%), the sidelink channel is not available, the sidelink channel is available, it takes a certain amount of time (e.g., 1 ms) to transmit one message over the sidelink channel, etc.

Information on the determined status of sidelink channel quality; e.g., sidelink channel is poor/good/medium, etc.

In addition, the methods described in the wireless device 12 embodiment above on how this information is conveyed to the vehicle, e.g., using either or a combination of visual, audial and/or haptic also applies to this embodiment. In other words, the network node 14 can provide an indication to the vehicle in the form of a visual indicator, an audial indicator, and/or a haptic indicator. Notifying the wireless device 12 of the assigned sidelink status can be done either when the driver starts the car, while the driver is driving the car, or a combination thereof.

In some embodiments, the method further includes transmitting, by communications interface 34, at least one of the obtained channel quality measurement data and the assigned sidelink status to at least one of another network node 14 and at least one other wireless device 12 (Block S180). In this embodiment, network node 14, rather than wireless device 12 may inform, either implicitly or explicitly, another node (i.e., another wireless device 12 or another network node 14) about the determined information on channel occupancy. This information can include the channel occupancy measurement result, or a channel busy ratio result and also the determined sidelink status.

In some embodiments, the assigned sidelink status indicates two or more levels of the status of the ITS sidelink, the levels including, reliable and unreliable.

In some embodiments, the assigned sidelink status indicates that the status of the ITS sidelink is one of an ITS sidelink operation is allowable, an ITS sidelink operation is not allowable, an ITS sidelink operation is allowable with limited reliability, the ITS sidelink is currently available, the ITS sidelink is of a medium quality, and the ITS sidelink is of a high quality.

In some embodiments, the channel quality measurement data includes at least one of a Channel Occupancy Rate (COR) measurement, a Channel Busy Ratio (CBR) measurement, a Radio Link Monitoring (RLM) measurement, a Sidelink-Reference Signal Received Power (S-RSRP) measurement, a Sidelink-Reference Signal Received Quality (S-RSRQ) measurement, a Sidelink-Reference Signal-Signal to Noise Ratio (S-RS-SINR) measurement, a Sidelink-Received Signal Strength Indicator (S-RSSI) and a bit error ratio (BER).

In some embodiments, assigning the sidelink status based on the obtained channel quality measurement data includes comparing the obtained channel quality measurements to at least one threshold, each of the at least one threshold indicative of a certain sidelink status level.

In some embodiments, the method further includes identifying, by processing circuitry 36, a composite channel quality measurement based on the obtained channel quality measurement data, the composite channel quality measurement obtained by at least one of majority decision, consensus decision, logical combination of relations between individual measurements, arithmetic combination of individual measurements, comparison between measurements, and comparison between measurements and at least one threshold.

In some embodiments, the channel quality measurement data of the ITS sidelink is obtained from the wireless device 12.

In some embodiments, the assigned sidelink status indicates a change in the status of the ITS sidelink.

In some embodiments, detecting the change in the status includes comparing a previous status to a currently determined status.

In some embodiments, the method includes providing a feedback indicator based on the sidelink status.

In some embodiments, if it is determined that a change in the ITS sidelink status is from a less reliable level to a more reliable level, processing circuitry 36 delays the providing of the feedback indicator by a predetermined amount of time, and if it is determined that a change in the ITS sidelink status is from a more reliable level to a less reliable level, the feedback indicator is provided without a delay.

In some embodiments, the channel quality measurement data of the ITS sidelink is obtained with a varying occurrence depending on a mobility state of the wireless device 12.

In some embodiments, the mobility state of the wireless device 12 includes at least one of a speed of the wireless device 12, a direction of movement of the wireless device 12, a change in the speed of the wireless device 12, a change in the direction of the movement of the wireless device 12, and at least one of a trajectory and path of movement of the wireless device 12.

Figure 5:
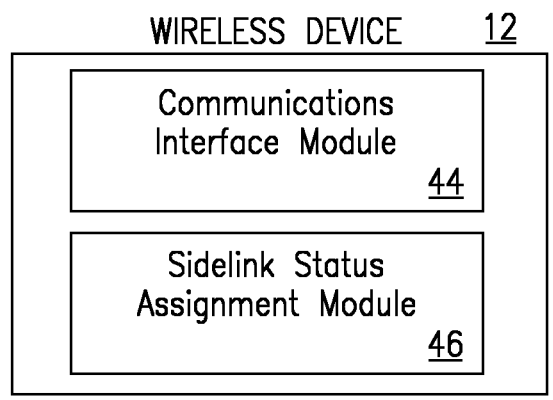
FIG. 5 is a block diagram of an alternate wireless device configured to provide notification of a status of an ITS sidelink in a communication network in accordance with the principles of the present disclosure.

FIG. 5 is a block diagram of an alternate wireless device 12. In this embodiment, a wireless device 12 configured to provide notification of a status of an ITS sidelink in a communication network 10 is provided. Wireless device 12 includes a communications interface module 44 configured to obtain channel quality measurement data of the ITS sidelink, and a sidelink status assignment module 46 configured to assign a sidelink status based on the obtained channel quality measurements, and cause the provision of a feedback indicator based on the sidelink status.

Figure 6:
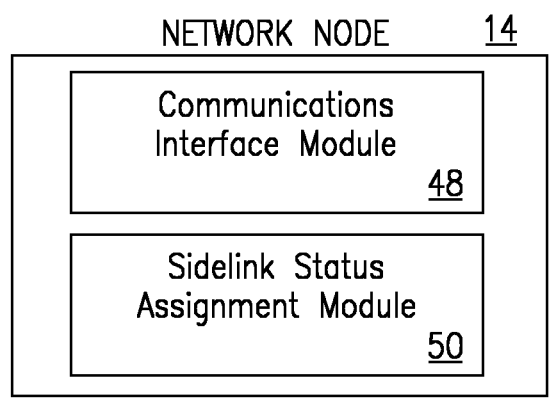
FIG. 6 is a block diagram of an alternate network node configured to provide notification of a status of an ITS sidelink in a communication network in accordance with the principles of the present disclosure.

FIG. 6 is a block diagram of an alternate network node 14. In this embodiment, a network node 14 for determining a status of an ITS sidelink in a communication network 10 is provided. Network node includes a communications interface module 48 configured to obtain channel quality measurement data of the ITS sidelink, and a sidelink status assignment module 50 configured to assign a sidelink status based on the obtained channel quality measurements, and cause the communications interface module 48 further to notify a wireless device 12 in the communication network 10 of the assigned sidelink status.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby form a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A method for using a wireless device to provide notification of a status of an intelligent traffic system (ITS) sidelink in a communication network, the method comprising:
   obtaining channel quality measurement data of the ITS sidelink;
   assigning a sidelink status based on the obtained channel quality measurement data, wherein the sidelink status indicates two or more levels of the status of the ITS sidelink; and
   providing a feedback indicator based on the sidelink status, wherein the feedback indicator indicates a change in the status of the ITS sidelink.

2. The method of claim 1, wherein the feedback indicator further indicates that the status of the ITS sidelink is one of: an ITS sidelink operation is allowable, an ITS sidelink operation is not allowable, an ITS sidelink operation is allowable with limited reliability, the ITS sidelink is currently available, the ITS sidelink is of a medium quality, and the ITS sidelink is of a high quality.

3. The method of claim 1, wherein in response to a determination that the change in the ITS sidelink status is from a less reliable level to a more reliable level, the method further comprises delaying the providing of the feedback indicator by a predetermined amount of time, and wherein in response to a determination that the change in the ITS sidelink status is from a more reliable level to a less reliable level, the method further comprises providing the feedback indicator without a delay.

4. The method of claim 1, wherein the channel quality measurement data includes at least one of: a Channel Occupancy Rate (COR) measurement, a Channel Busy Ratio (CBR) measurement, a Radio Link Monitoring (RLM) measurement, a Sidelink-Reference Signal Received Power (S-RSRP) measurement, a Sidelink-Reference Signal Received Quality (S-RSRQ) measurement, a Sidelink-Reference Signal-Signal to Noise Ratio (S-RS-SINR) measurement, a Sidelink-Received Signal Strength Indicator (S-RSSI), and a bit error ratio (BER).

5. The method of claim 1, further comprising identifying a composite channel quality measurement based on the obtained channel quality measurement data, the composite channel quality measurement obtained by at least one of: a majority decision, a consensus decision, a logical combination of relations between individual measurements, an arithmetic combination of individual measurements, a comparison between measurements, and a comparison between measurements and at least one threshold.

6. The method of claim 1, wherein the providing the feedback indicator comprises providing the feedback indicator to at least one of: at least one network node and at least one other wireless device.

7. The method of claim 1, wherein the channel quality measurement data of the ITS sidelink is obtained with a varying occurrence depending on a mobility state of the wireless device, and wherein the mobility state of the wireless device comprises at least one of: a speed of the wireless device, a direction of movement of the wireless device, a change in the speed of the wireless device, a change in the direction of the movement of the wireless device, and at least one of a trajectory and path of movement of the wireless device.

8. A wireless device configured to provide notification of a status of an intelligent traffic system (ITS) sidelink in a communication network, the wireless device comprising:
 a communications interface configured to obtain channel quality measurement data of the ITS sidelink; and
 processing circuitry including a memory and a processor, the memory in communication with the processor, the memory having instructions that, when executed by the processor, configure the processor to:
  assign a sidelink status based on the obtained channel quality measurement data, wherein the sidelink status indicates two or more levels of the status of the ITS sidelink; and
  cause provision of a feedback indicator based on the sidelink status, wherein the feedback indicator indicates a change in the status of the ITS sidelink.

9. The wireless device of claim 8, wherein the feedback indicator further indicates that the status of the ITS sidelink is one of: an ITS sidelink operation is allowable, an ITS sidelink operation is not allowable, an ITS sidelink operation is allowable with limited reliability, the ITS sidelink is currently available, the ITS sidelink is of a medium quality, and the ITS sidelink is of a high quality.

10. The wireless device of claim 8, wherein the processor is further configured to identify a composite channel quality measurement based on the obtained channel quality measurement data, the composite channel quality measurement obtained by at least one of: a majority decision, a consensus decision, a logical combination of relations between individual measurements, an arithmetic combination of individual measurements, a comparison between measurements, and a comparison between measurements and at least one threshold.

11. The wireless device of claim 8, wherein the channel quality measurement data of the ITS sidelink are obtained from a network node.

12. The wireless device of claim 8, wherein the communications interface is further configured to provide the feedback indicator to at least one of: a network node and at least one other wireless device.

13. The wireless device of claim 8, wherein the channel quality measurement data of the ITS sidelink is obtained with a varying occurrence depending on a mobility state of the wireless device, and wherein the mobility state of the wireless device comprises at least one of: a speed of the wireless device, a direction of movement of the wireless device, a change in the speed of the wireless device, a change in the direction of the movement of the wireless device, and at least one of a trajectory and path of movement of the wireless device.

14. A method, in a network node, for determining a status of an intelligent traffic system (ITS) sidelink in a communication network, the method comprising:
 obtaining channel quality measurement data of the ITS sidelink;
 assigning a sidelink status based on the obtained channel quality measurement data, wherein the sidelink status indicates two or more levels of the status of the ITS sidelink;
 notifying a wireless device in the communication network of the assigned sidelink status; and
 providing a feedback indicator based on the sidelink status, wherein the feedback indicator indicates a change in the status of the ITS sidelink.

15. The method of claim 14, further comprising transmitting at least one of: the obtained channel quality measurement data and the assigned sidelink status to at least one of another network node and at least one other wireless device.

16. The method of claim 14, wherein the assigned sidelink status indicates that the status of the ITS sidelink is one of: an ITS sidelink operation is allowable, an ITS sidelink operation is not allowable, an ITS sidelink operation is allowable with limited reliability, the ITS sidelink is currently available, the ITS sidelink is of a medium quality, and the ITS sidelink is of a high quality.

17. The method of claim 14, wherein the channel quality measurement data includes at least one of: a Channel Occupancy Rate (COR) measurement, a Channel Busy Ratio (CBR) measurement, a Radio Link Monitoring (RLM) measurement, a Sidelink-Reference Signal Received Power (S-RSRP) measurement, a Sidelink-Reference Signal Received Quality (S-RSRQ) measurement, a Sidelink-Reference Signal-Signal to Noise Ratio (S-RS-SINR) measurement, a Sidelink-Received Signal Strength Indicator (S-RSSI), and a bit error ratio (BER).

18. The method of claim 14, further comprising identifying a composite channel quality measurement based on the obtained channel quality measurement data, the composite channel quality measurement obtained by at least one of: a majority decision, a consensus decision, a logical combination of relations between individual measurements, an arithmetic combination of individual measurements, a comparison between measurements, and a comparison between measurements and at least one threshold.

19. The method of claim 14, wherein the channel quality measurement data of the ITS sidelink is obtained from the wireless device.

20. The method of claim 14, wherein in response to a determination that the ITS sidelink status has changed from a less reliable level to a more reliable level, the method further comprises delaying the providing of the feedback indicator by a predetermined amount of time, and wherein in response to a determination that a change in the ITS sidelink status is from a more reliable level to a less reliable level, the method further comprises providing the feedback indicator without a delay.

21. The method of claim 14, wherein the channel quality measurement data of the ITS sidelink is obtained with a varying occurrence depending on a mobility state of the wireless device, and wherein the mobility state of the wireless device comprises at least one of: a speed of the wireless device, a direction of movement of the wireless device, a change in the speed of the wireless device, a change in the direction of the movement of the wireless device, and at least one of a trajectory and path of movement of the wireless device.

22. A network node for determining a status of an intelligent traffic system (ITS) sidelink in a communication network, the network node comprising:
 a communications interface configured to obtain channel quality measurement data of the ITS sidelink; and processing circuitry including a memory and a processor, the memory in communication with the processor, the memory having instructions that, when executed by the processor, configure the processor to:

assign a sidelink status based on the obtained channel quality measurement data, wherein the sidelink status indicates two or more levels of the status of the ITS sidelink;

cause the communications interface to notify a wireless device in the communication network of the assigned sidelink status; and provide a feedback indicator based on the sidelink status, wherein the feedback indicator indicates a change in the status of the ITS sidelink.

23. The network node of claim 22, wherein the communications interface is further configured to transmit at least one of: the obtained channel quality measurement data and the assigned sidelink status to at least one of another network node and at least one other wireless device.

24. The network node of claim 22, wherein the processor is further configured to identify a composite channel quality measurement based on the obtained channel quality measurement data, the composite channel quality measurement obtained by at least one of: a majority decision, a consensus decision, a logical combination of relations between individual measurements, an arithmetic combination of individual measurements, a comparison between measurements, and a comparison between measurements and at least one threshold.

* * * * *